(12) United States Patent
Kamal

(10) Patent No.: US 11,405,782 B2
(45) Date of Patent: Aug. 2, 2022

(54) METHODS AND SYSTEMS FOR SECURING AND UTILIZING A PERSONAL DATA STORE ON A MOBILE DEVICE

(71) Applicant: Mastercard International Incorporated, Purchase, NY (US)

(72) Inventor: Ashfaq Kamal, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 16/925,688

(22) Filed: Jul. 10, 2020

(65) Prior Publication Data

US 2021/0014682 A1 Jan. 14, 2021

Related U.S. Application Data

(60) Provisional application No. 62/872,773, filed on Jul. 11, 2019.

(51) Int. Cl.
*H04W 12/06* (2021.01)
*G06K 19/077* (2006.01)
(Continued)

(52) U.S. Cl.
CPC ...... *H04W 12/06* (2013.01); *G06K 19/07732* (2013.01); *G06Q 20/326* (2020.05);
(Continued)

(58) Field of Classification Search
CPC ..... H04W 12/06; H04W 12/35; H04W 8/205; H04L 9/0841; H04L 9/0894;
(Continued)

(56) References Cited

U.S. PATENT DOCUMENTS 9,686,076 B2 * 6/2017 Hauck ................. H04W 12/06
9,769,162 B2 9/2017 De Jong
(Continued)

FOREIGN PATENT DOCUMENTS

EP 2670105 A 12/2013
KR 10-2014-0088933 A 7/2014
WO WO-2015096940 A1 * 7/2015 ....... G06Q 20/35765

OTHER PUBLICATIONS

PCT International Search Report and Written Opinion, dated Oct. 8, 2020, PCT Application No. PCT/US2020/041495, 9 pp.

*Primary Examiner* — Kristine L Kincaid
*Assistant Examiner* — Lydia L Noel
(74) *Attorney, Agent, or Firm* — Buckley, Maschoff & Talwalkar LLC

(57) ABSTRACT

Methods and apparatus for securing access to an encrypted personal data store on a mobile device. In some embodiments, a universal integrated circuit card (UICC) processor receives, from a mobile device processor of a mobile device having an encrypted Personal Data Store (PDS), a PDS access request associated with a mobile application, then determines that access control rules are stored in at least one access control rules database and transmits to the mobile device processor, the access control rules governing access to the data in the encrypted PDS. The process also includes the UICC processor receiving a request for a symmetric shared secret and transmitting the symmetric shared secret to the mobile device processor for use in accessing the PID of the user stored in the encrypted PDS in accordance with the access control rules.

19 Claims, 5 Drawing Sheets

(51) Int. Cl.
*G06Q 20/32* (2012.01)
*H04L 9/08* (2006.01)
*H04W 8/20* (2009.01)
*H04W 12/30* (2021.01)

(52) U.S. Cl.
CPC ........... *H04L 9/0841* (2013.01); *H04W 8/205* (2013.01); *H04W 12/35* (2021.01)

(58) Field of Classification Search
CPC .............. H04L 2209/80; G06Q 20/326; G06Q 20/3576; G06Q 20/363; G06Q 20/3227; G06K 19/07732
See application file for complete search history.

(56) References Cited

U.S. PATENT DOCUMENTS

| | | | | |
|---|---|---|---|---|
| 10,796,009 | B2 * | 10/2020 | Aissi | G06F 21/57 |
| 2006/0196931 | A1 * | 9/2006 | Holtmanns | H04L 63/061 |
| | | | | 235/380 |
| 2010/0246819 | A1 * | 9/2010 | Candelore | H04N 21/8186 |
| | | | | 380/210 |
| 2013/0149996 | A1 * | 6/2013 | King | H04W 12/08 |
| | | | | 455/411 |
| 2015/0026759 | A1 * | 1/2015 | Krisna | G06F 21/53 |
| | | | | 726/1 |
| 2015/0033291 | A1 * | 1/2015 | Nicolau | H04W 12/35 |
| | | | | 726/3 |
| 2015/9339659 | | 11/2015 | Ballestero | |
| 2016/0099923 | A1 * | 4/2016 | Golla | H04L 9/3234 |
| | | | | 713/171 |
| 2018/0091502 | A1 * | 3/2018 | De Jong | H04L 63/0853 |
| 2020/0052905 | A1 * | 2/2020 | Mathias | H04L 9/0861 |

* cited by examiner

| Endpoint Name | Description | Inputs | Outputs |
|---|---|---|---|
| 160 → generateSharedKey 162 ↗ | Function that generates a shared key based off of the ECDH algorithm specified in RFC 6090. | • keyId of type String<br>• publicKey of type byte[] | Byte[] consisting of the shared secret. |
| 162 → keyExists | Function to check if the key for a keyId exists on the TA | • keyId of type String | true or false (boolean) |
| 164 → deleteKey | Function to delete a key for a particular keyId | • keyId of type String | true if deletion is successful, false otherwise (boolean) |
| 166 → encryptWithSharedKey | Function to encrypt data with the shared ECDH key. | • keyId of type String<br>• byte[] of data to encrypt | Byte[] representing the encrypted data or an error message. |
| 168 → decryptWithSharedKey | Function to decrypt data with the shared key. | • keyId of type String<br>• byte[] of data to decrypt | Byte[] representing the decrypted data or an error message. |
| 170 → secureDataStore | Function to securely store data on the SE using the default SE storage API. | • dataId of type String<br>• byte[] of data to store | true if success, false otherwise. |
| 172 → secureDataRetrieval | Function to securely retrieve data from the SE using the default SE storage API. | • data of type String | Byte[] representing the retrieved data |

METHODS AND SYSTEMS FOR SECURING AND UTILIZING A PERSONAL DATA STORE ON A MOBILE DEVICE

CROSS REFERENCE TO RELATED APPLICATION

This application claims the benefit of U.S. Provisional Patent Application No. 62/872,773 filed on Jul. 11, 2019, the contents of which provisional application are hereby incorporated by reference for all purposes.

FIELD OF THE INVENTION

Embodiments described herein generally relate to methods and apparatus for securing and utilizing a user's personally identifiable data which is stored in a personal data store (PDS) on the user's mobile device. More specifically, in embodiments cryptographic services of a universal integrated circuit card (UICC) (operably connected to the user's mobile device) are leveraged to protect the user's personally identifiable data stored in the PDS from unauthorized access, wherein the PDS constitutes a portion of regular memory.

BACKGROUND

Consumers are increasingly using portable electronic devices, such as smartphones and tablet computers, for many diverse tasks including for communication and data exchange purposes throughout the day and at multiple locations. Thus, efforts to improve the ease of use, expand the functionality, and enhance the security of such mobile electronic devices are ongoing.

In the mobile telecommunications field, a smart card provides the mechanism by which a mobile device (e.g., a smartphone or tablet computer) is "locked" to a specific telecommunications network of a mobile network operator (MNO). For example, Verizon Communications Inc. owns the wireless service provider or MNO called Verizon Wireless, which provides wireless communications services to consumers. Specifically, Verizon Communications Inc. owns or controls all the elements necessary to sell and deliver wireless services to an end user (consumer or customer) including radio spectrum allocation, wireless network infrastructure, billing, customer care, provisioning computer systems, and marketing and repair organizations. The MNO's smart card (for example, a subscriber identity module or "SIM" card) is typically mounted to or connected within the user's mobile device, and operates to provide the user or network subscriber (customer of the MNO) with authorization to use the mobile device in the MNO's network. In addition, the smart card provides the mobile network operator with the ability to control the way the mobile device is used in the network.

A universal integrated circuit card (UICC) is the smart card used in mobile devices in the Global System for Mobile communications (GSM) network, and in the Universal Mobile Telecommunications System (UMTS) network. The UICC may include a central processing unit (CPU) or other processor(s), a Read-Only Memory (ROM), a Random Access Memory (RAM), an EEPROM memory, and input/output (I/O) circuitry. The UICC ensures the integrity and security of all kinds of personal data, and typically holds a few hundred kilobytes to a Gigabyte or more of data. In a GSM network, the UICC includes a Subscriber Identity Module (SIM) application, whereas in a UMTS network, the UICC contains a universal subscriber identity module (USIM) application. The UICC may contain a plurality of applications which make it possible, for example, for the same UICC (smart card) to provide access to both GSM and UMTS networks. In addition, the UICC may provide storage of additional applications and data, such as a phone book that includes a contact list of phone numbers of persons associated with the customer or owner of the mobile device.

Mobile device users download various applications for use on their mobile device, some of which require the user or consumer to first enroll or register by providing user identification and/or verification credentials. Thus, it is common to create digital copies of physical identification documents, such as a consumer's driver's license or passport, by scanning or photographing such documents and then storing them on the mobile device for future use. In some cases, the digital copies of such identification documents are stored locally on the consumer's mobile device in a portion of regular memory called a personal data store (PDS) for ease of use. For example, the identification data stored in the PDS can be used by a user when he or she wishes to enroll or register to an application in order to utilize that application, and the like. In this manner, consumers or users control their own personally identifiable data, because the personally identifiable data is stored locally (in the PDS of the consumer's mobile device) and not in a remote location (such as in the memory of a remote server or in cloud storage, which is typically provided by a third party).

The possibility of losing or misplacing a mobile device (such as a smartphone or tablet computer), or leaving the mobile device unattended, or having the mobile device stolen, or having the mobile device hacked by vandals, presents user mobile device security challenges. Users and/or consumers are generally not able to fully prevent their mobile device itself (which typically contains personally identifiable data and/or often very important data, such as financial data) from falling into the wrong hands, or from being hacked by unscrupulous persons. Thus, it is important to provide processes and/or systems for preventing unauthorized access to the user's personally identifiable data (PID) in the personal data store (PDS) of the consumer's mobile device (in order to prevent misuse of the device and/or to prevent financial loss).

Conventional data loss prevention approaches cannot always be utilized for consumer mobile devices because the mobile devices themselves often have less computing capacity than personal computers. For example, most consumer mobile devices (such as smartphones) are battery-powered, and thus are often optimized for energy efficiency. Therefore, a mobile device data protection system and/or scheme must operate efficiently to preserve processor and memory capacity for system resources and user applications, should present a minimal burden to users, and should avoid presenting a significant resource drain that could result in high energy utilization. Conventional data loss prevention approaches, such as system-wide deployment of file encryption, would require extra processing overhead of encryption, decryption, or both each time data is to be written, accessed, and/or modified. Such data loss prevention approaches for mobile devices are therefore undesirable from an operational standpoint. Thus, use of conventional data loss prevention approaches could cause some consumer mobile devices to operate somewhat inefficiently and/or utilize too much battery power.

It would therefore be desirable to provide a process and/or apparatus that efficiently secures a user's personally identifiable data (PID) stored in a Personal Data Store (PDS) from unauthorized access in a manner that avoids becoming a significant resource drain. In addition, it would be desirable to ensure that the secure PDS data can be persisted across multiple authorized applications, or apps, which are running and/or which are utilized by the consumer on the consumer's mobile device.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein:

FIG. 1B is a table illustrating PDS cryptography application API endpoints in accordance with some embodiments of the disclosure;

DETAILED DESCRIPTION

Figure 1A:
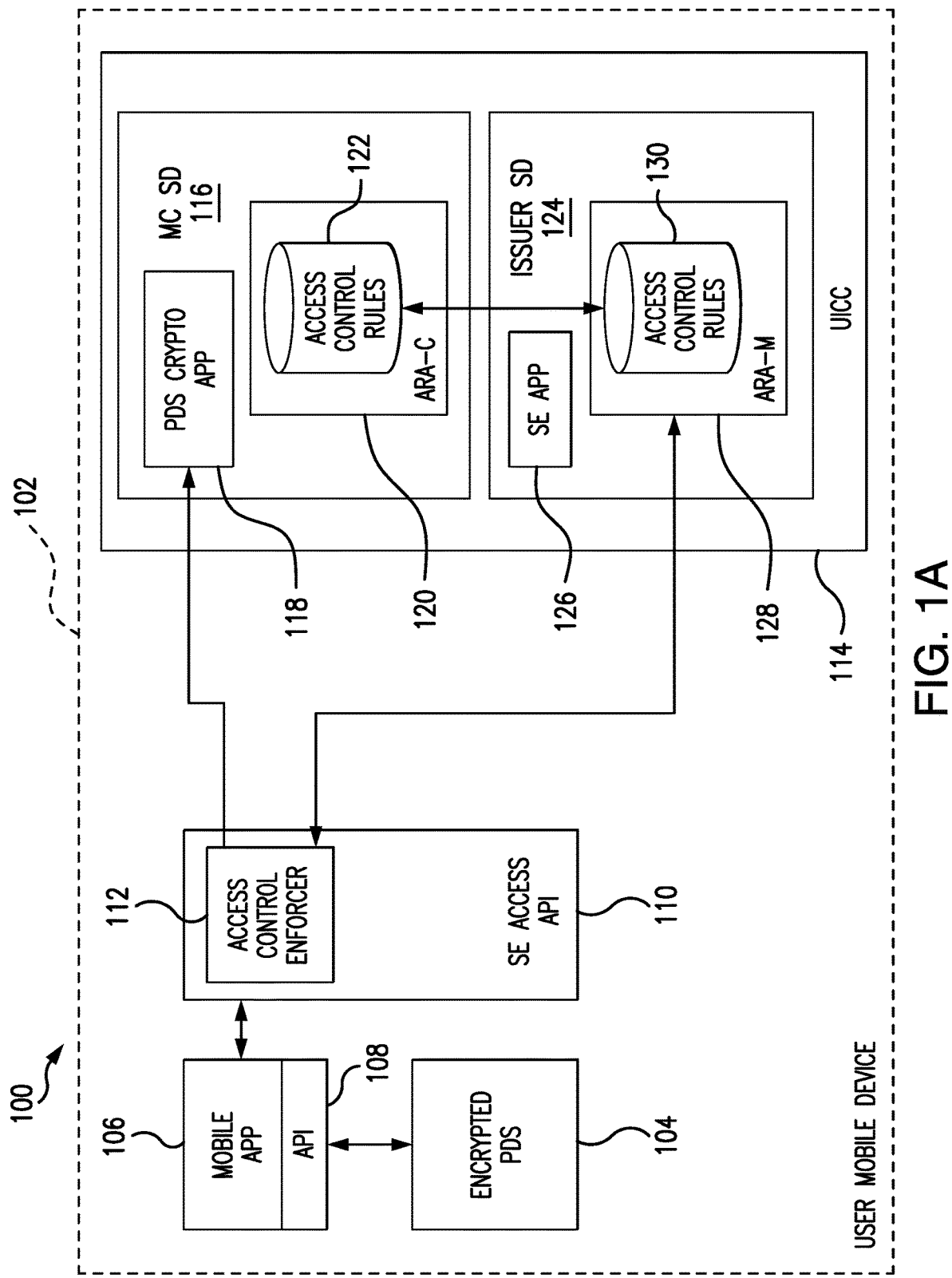
FIG. 1A is a functional block diagram illustrating mobile device operational components used in a secure Personal Data Store (PDS) process in accordance with some embodiments of the disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "user" may be used interchangeably with the term "consumer" or "customer," and such terms are used herein to refer to a person, individual, cardholder, accountholder, owner or employee who owns and/or uses a mobile device. The user may own (or be authorized to use) a financial account such as a payment account (for example, a payment card account such as a credit card account or a debit card account). Thus, the term "payment account" or "payment card account" may include a credit card account, a debit card account, a loyalty card account, a savings account, a checking account, or any other type of payment account or financial account that the consumer or accountholder may access. As used herein, the term "issuer" and/or "issuer financial institution (FI)" is used to refer to the financial institution or entity that issues a payment account to a user or consumer or customer or accountholder.

In addition, the term "mobile device" may include any type of electronic mobile device, such as a smartphone, a laptop computer, or a tablet computer, having wireless communications capability. In some embodiments, a user's mobile device may include a "wallet application" that permits the user to select one of a number of payment card account applets (sometimes referred to as "cardlets") for use in an electronic payment transaction or purchase transaction. In some embodiments, each cardlet or payment card account applet may be associated with a different payment card account that belongs to the user of a smartphone. For example, each cardlet may incorporate a payment card account number and other information or data corresponding to or associated with the respective payment card account of the user.

In general, and for the purposes of introducing concepts of novel embodiments described herein, disclosed are methods and apparatus for protecting a mobile device user's personally identifiable data from unauthorized access. In implementations, the personally identifiable data is stored in a personal data store (PDS) that constitutes a portion of a regular memory or storage area of the user's mobile device. In embodiments disclosed herein, the cryptographic services of a universal integrated circuit card (UICC) operably connected to the user's mobile device are leveraged to protect the user's personally identifiable data (stored in the PDS) from unauthorized access by a mobile application. UICCs are considered "universal" because a single card may support multiple applications and therefore could be used with multiple cellular networks allowing the UICCs to work with various mobile or cellular networks of MNO's around the world. In addition, each UICC card 114 has a unique identifier that may be used to identify a user's mobile device on a particular cellular network of an MNO.

FIG. 1A is a functional block diagram 100 illustrating mobile device operational components used in a secure Personal Data Store (PDS) process in accordance with some embodiments. The secure PDS process efficiently protects a user's personally identifiable data from unauthorized access in a manner that avoids becoming a significant resource drain on the consumer's mobile device. Specifically, consumer or user mobile devices are battery-powered and thus are often optimized for energy efficiency. Consequently, a user mobile device data protection system and/or scheme must operate efficiently to conserve battery power, and also to safeguard processor and memory capacity (system resources) so that user applications perform or function in the best possible manner. The disclosed PDS process thus avoids presenting a significant resource drain that could result in high energy utilization and/or excessive use of system resources while also presenting a minimal burden on users. In addition, embodiments of the PDS process ensure that personally identifiable data (PID) of the consumer (the secure PDS data) is persisted across multiple authorized applications (or Apps) which are running and/or which are utilized by the consumer on the consumer's mobile device.

Referring again to FIG. 1A, the dotted line 102 indicates a user's mobile device that includes an encrypted personal data store (PDS) component 104 (of a regular memory, not shown) which includes personally identifiable data (PID) of the user. A user may launch a mobile application 106, for example by touching an icon on a touch screen (not shown) of the user's mobile device, and then utilize an application programming interface (API) 108 which appears on the screen to provide input. The user input can be utilized to access data including the user's PID stored in the encrypted PDS 104. The mobile application 106 may also include instructions for accessing a secure element (SE) access API 110, which includes an access control enforcer module 112. A universal integrated circuit card (UICC) 114, which in some embodiments functions in the same or similar manner as a subscriber identity module (SIM), may be provided by a Mobile Network Operator (MNO) (not shown) for use in the user's mobile device 102. For example, when the user subscribes or agrees to join the MNO's cellphone network, the user is provided with a UICC to insert into a receptacle (not shown) of the user's mobile device (such as a smartphone). In the current example, the UICC 114 is recognized as being a secure element (SE) and includes a Mastercard Secure Device (MC SD) 116 (which in other embodiments may instead be a SD associated with a different payment card account processing organization or another entity) and an issuer Secure Device (issuer SD) 124. As will be explained in more detail below, the UICC 114 is an integrated circuit that includes a UICC processor operably connected to one or more storage devices and thus is essentially a miniature version of a computer.

The MC SD 116 shown in FIG. 1A includes a personal data store (PDS) cryptographic application (PDS Crypto App)118 (or PDS Crypto cardlet), an Access Rule Application Client (ARA-C) 120, and a first access control rules database 122. The first access control rules database 122 stores access control rules associated with a payment card account processing entity (in this example, Mastercard International Incorporated). The issuer secure device (issuer SD) 124 includes a Secure Element application (SE APP) 126 (or SE cardlet), an Access Rule Application Master (ARA-M) 128, and a second access control rules database 130. The second access control rules database 130 stores access control rules of an issuer, which is the issuer financial institution (FI) that issued a financial account to the user.

In some embodiments, the access control rules 122 of the payment card account processor and the access control rules 130 of the issuer may be accessed when a mobile application selected by the user needs to or attempts to access PID of the user which is stored in the encrypted PDS 104 (for example, to obtain personally identifiable data, add personally identifiable data, or modify personally identifiable data). In such cases, the mobile application 106 must first be authorized to access the user's PID before the PDS crypto application 118 of the UICC 114 will provide an encryption key that is needed to access or unlock the encrypted PDS 104 so that the user's PID can be accessed by the mobile application selected by the user of the mobile device 102.

In some embodiments, when the mobile application 106 (which is an "off-UICC secure element" application) requires access to personally identifiable data (PID) of the user, the mobile application must first communicate with the Secure Element Access (SE Access) API 110. The SE Access API 110 then communicates with the Personal Data Store (PDS) Crypto application 118 running inside the MC SD 116 on the UICC 114. Thus, in some embodiments when the user or consumer first initiates the mobile application 106, he or she is required to authenticate the mobile application by providing, for example, a mobile device personal identification number (mPIN) and/or biometric data and/or satisfy another type of consumer verification method (CVM). In order to do so, the user or consumer utilizes input components (not shown in FIG. 1A, but see FIG. 3 which is discussed below) that are integral to the mobile device 102 to authenticate to the mobile application 106. For example, the user may utilize a touch screen 312 (see FIG. 3) to provide a mobile personal identification number (mPIN), and/or may utilize a biometric sensor 308 (FIG. 3; such as a fingerprint sensor) to provide user biometric data (such as a fingerprint) in response to a customer verification method (CVM). In some other implementations, the encrypted PDS 104 implicitly trusts the user authentication result (Yes/No) that is generated.

After the user is authenticated by the mobile application 106, then in some embodiments a mobile device processor 304 (see FIG. 3) generates a hash of the unique identifier (the application identifier or "AID") associated with the mobile application and provides the mobile application's hashed unique identifier to the SE Access API 110 as an input parameter. An AID is a unique identifier which has been assigned to an iOS mobile application by the Apple™ store for mobile devices running iOS (the Apple™ operating system). Such unique identifiers are also assigned by the Google Play™ store for mobile devices running the Android™ operating system (accordingly, in either case, the unique identifier is assigned by an entity associated with the ecosystem and/or operating system in which the mobile device operates).

Referring again to FIG. 1A, after the mobile application's hashed unique identifier is provided to the SE Access API 110 as an input parameter a connection is then made to the MC SD 116 of the UICC 114. An attempt is then made to find rules that match the mobile application 106 by searching the access control rules database 122 of the ARA-C 120 and/or the access control rules database 130 of the ARA-M 128, and if found, enforce those rules. For example, if the mobile application 106 is a mobile payment application associated with a payment card account provide by an issuer financial institution (FI) for the user, then the access control rules for that mobile payment application may be found in the ARA-M 128 (which was provided by the issuer of the user's payment card account). In this example, the access control rules found in the ARA-M 128 govern what the mobile payment application 106 is permitted to do and what the mobile payment application cannot do. Continuing with this example, the mobile application 106 next transmits a request to the PDS Crypto application 118 to generate a symmetric shared secret.

In some embodiments, a secret key is agreed to anonymously using an Elliptic-curve Diffie-Hellman (ECDH) key agreement algorithm, which is known to those skilled in the art. The ECDH agreement algorithm is an anonymous key agreement protocol that allows two parties, each having an elliptic-curve public-private key pair, to establish a shared secret over an insecure channel, which shared secret may be directly used as a key, or to derive another key. Thus, the actual secret key is not transmitted between the parties.

Referring again to FIG. 1A, next the mobile application 106 makes an Application Data Unit (APDU) call to the PDS Crypto services cardlet 118 and passes a unique "key_ID" which points to a shared secret for the encrypted PDS 104. The PDS Crypto services cardlet then locates the shared secret by using the key_ID and transmits it to the access control enforcer module 112 of the SE Access API 110. Next, the access control enforcer module 112 decrypts the encrypted PDS data using the shared secret, and then transmits that decrypted PID of the user (personally identifiable data of the user) to the mobile application 106. The result is that the mobile application 106 can then access and/or use personally identifiable data of the user which is stored in the encrypted PDS 104, for example, and transmit that PID to a third-party application, and the like as needed. In another implementation, the access control enforcer module 112 utilizes the shared secret to permit the mobile application to add an entry to the PID (add further information and/or data) in the encrypted PDS 104, or to modify an entry in the encrypted PDS 104.

FIG. 1B is a table 150 illustrating examples of PDS cryptography application API endpoints in accordance with some embodiments of the disclosure. An endpoint is one end of a communication channel, and when an API interacts with another system, the touchpoints of this communication are considered endpoints. For APIs, an endpoint can include a uniform resources locator (URL) of a server or of a service, and each endpoint is the location from which the APIs can access the resources they need to carry out their function. APIs work using 'requests' and 'responses' and thus when an API requests information from a web application or web server, it will receive a response. Thus, the place that APIs send requests and where the resource lives, is called an endpoint.

As shown in FIG. 1B, the columns of table 150 include an endpoint name 152, a description 154, the inputs 156, and the outputs 158. For example, the endpoint in row 160 has a name "generateSharedKey," which is a function that generates a shared key based on the ECDH algorithm having inputs "KeyId" and "publicKey" and an output Byte consisting of a shared secret. The endpoint in row 162 has a name "keyExists," which is a function to check if a key for a KeyID exists, and it has inputs "keyId" and an output of true or false. The endpoint in row 164 has a name "deleteKey," which is a function to delete a key for a particular keyID and has inputs "keyId" of type string and an output of true if deletion is successful or false if otherwise. The endpoint name in row 166 is "encryptWithSharedKey," which is a function to encrypt data with the shared ECDH key and has inputs of "keyId" and byte of data to encrypt, and an output byte representing the encrypted data or an error message. The endpoint name in row 168 is "decryptWithSharedKey," which is a function to decrypt data with the shared key and has inputs of "keyId" of type String and a byte of data to decrypt, and an output of true if successful or an error message if not. The endpoint name in row 170 is "secureDataStore," which is a function to securely store data on the secure element using the default secure element (SE) storage API, and has inputs of "dataId" of type String and a byte of data to store, and has an output of true for success or false for failure. Lastly, the endpoint name in row 172 is "secureDataRetrieval," which is a function to securely retrieve data from the SE using the default SE storage API, and has inputs of "dataId" of type String and has an output of a Byte representing the retrieved data.

Figure 2:
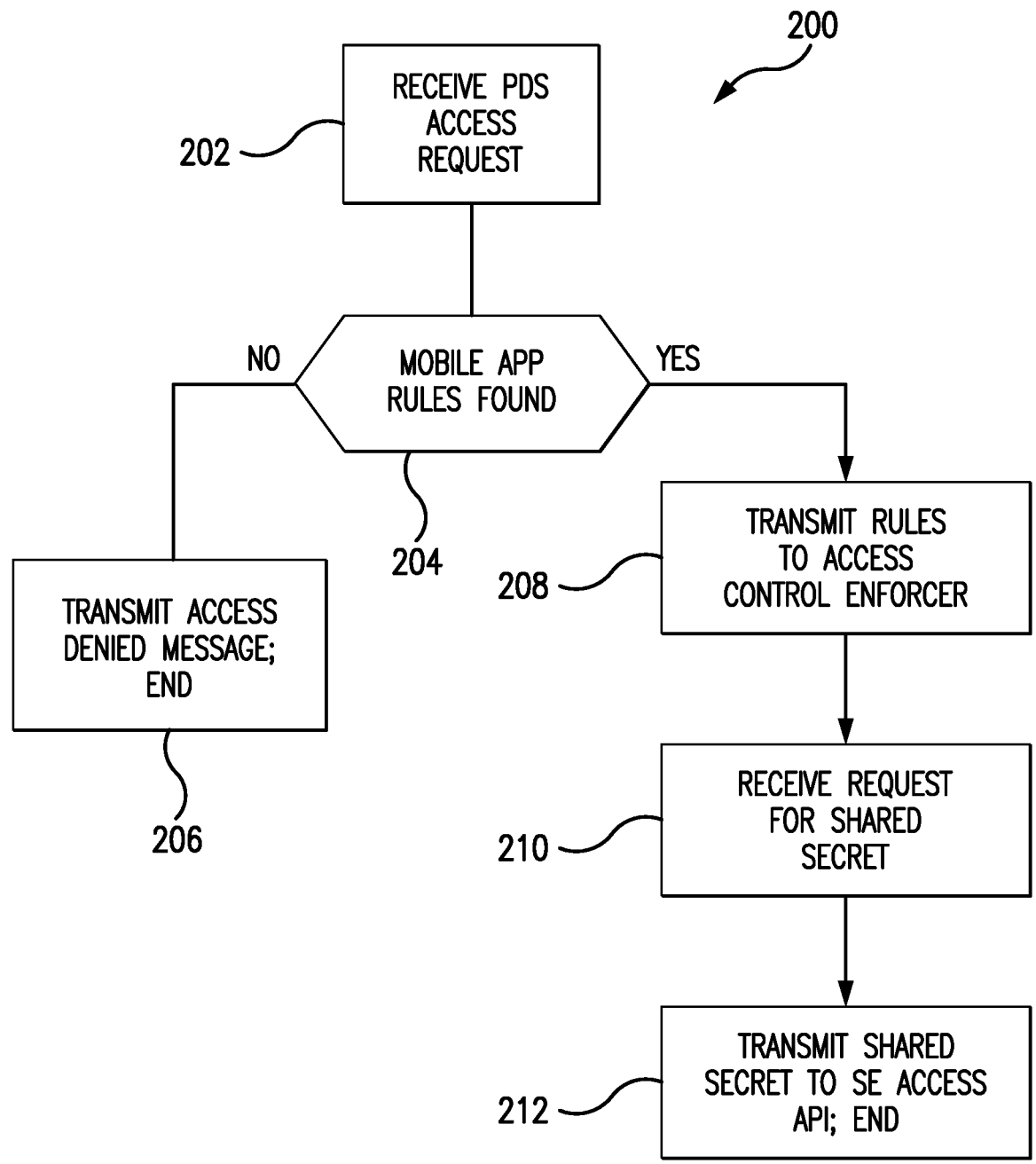
FIG. 2 is a flowchart of a method for securing access to an encrypted PDS on a mobile device in accordance with embodiments of the disclosure.

FIG. 2 is a flowchart of a method 200 for securing access to an encrypted PDS on a mobile device in accordance with some embodiments. In some implementations, the mobile device user or consumer launches a mobile device application and then provides user input data for use to authenticate the user by the mobile application running on a mobile device processor. For example, the mobile application may be a mobile payment application provided by an issuer financial institution to the user, and the user may be required to provide a mobile device personal identification number (mPIN), and/or biometric data or the like for authentication purposes (to satisfy a consumer verification method (CVM) requirement of the issuer, for example) before being able to utilize that mobile payment application. After the user provides the required user authentication input data, for example, biometric data such as iris scan data or fingerprint data and is authenticated (for example, by matching stored biometric template data of the user), the mobile device processor (which is running the mobile payment application), transmits via the Secure Element Access (SE Access) API 110 a PDS access request to the UICC 114.

Referring again to FIG. 2, a UICC processor of the UICC 114 receives 202 the PDS access request. In some implementations, the UICC processor is running a Personal Data Store (PDS) Crypto application which receives the PDS access request from the SE access API. Next, the UICC processor determines 204 if matching rules for the mobile application 106 are stored in the first access control rules database 122 of the ARA-C 120 and/or in the second access control rules database 130 of the ARA-M 128. If no rules are found for the mobile application, then the UICC processor via the PDS crypto application 118 transmits 206 an access denied message to the mobile device processor via the SE Access API 110, and the process ends 206.

However, if mobile application rules are found for the mobile payment application (in either the first access control rules database 122 and/or the second access control rules database 130), then the UICC processor via the PDS crypto application 118 transmits 210 those found rules to the mobile device processor via the access control enforcer module 112 of the SE Access API 110 for enforcement. Continuing the above example of a mobile payment application requesting access to data in the encrypted PDS 104, then the rules governing that mobile payment application may be found in the second access control rules database 130 of ARA-M 128 and utilized to govern what the mobile payment application is permitted to do and what the mobile payment application cannot do including what operations can be performed concerning the personally identifiable data (PID) of the user.

Referring again to FIG. 2, next the UICC processor via the PDS Crypto application 118 receives 210 a request for a symmetric shared secret from the mobile device processor running the mobile application 106, wherein the request for the symmetric shared secret includes a unique "key_Id" which points to the shared secret for decrypting data stored within the encrypted PDS 104. The UICC processor via the PDS Crypto application 118 then finds and transmits 212 the shared secret to the mobile device processor running the Access Control Enforcer module 112 of the SE Access API 110, which then utilizes the shared secret to decrypt the desired encrypted PDS data for the mobile payment application. Accordingly, mobile payment application running on the mobile device processor can then access and utilize the personally identifiable data (PID) of the user in accordance with the access control rules.

Figure 3:
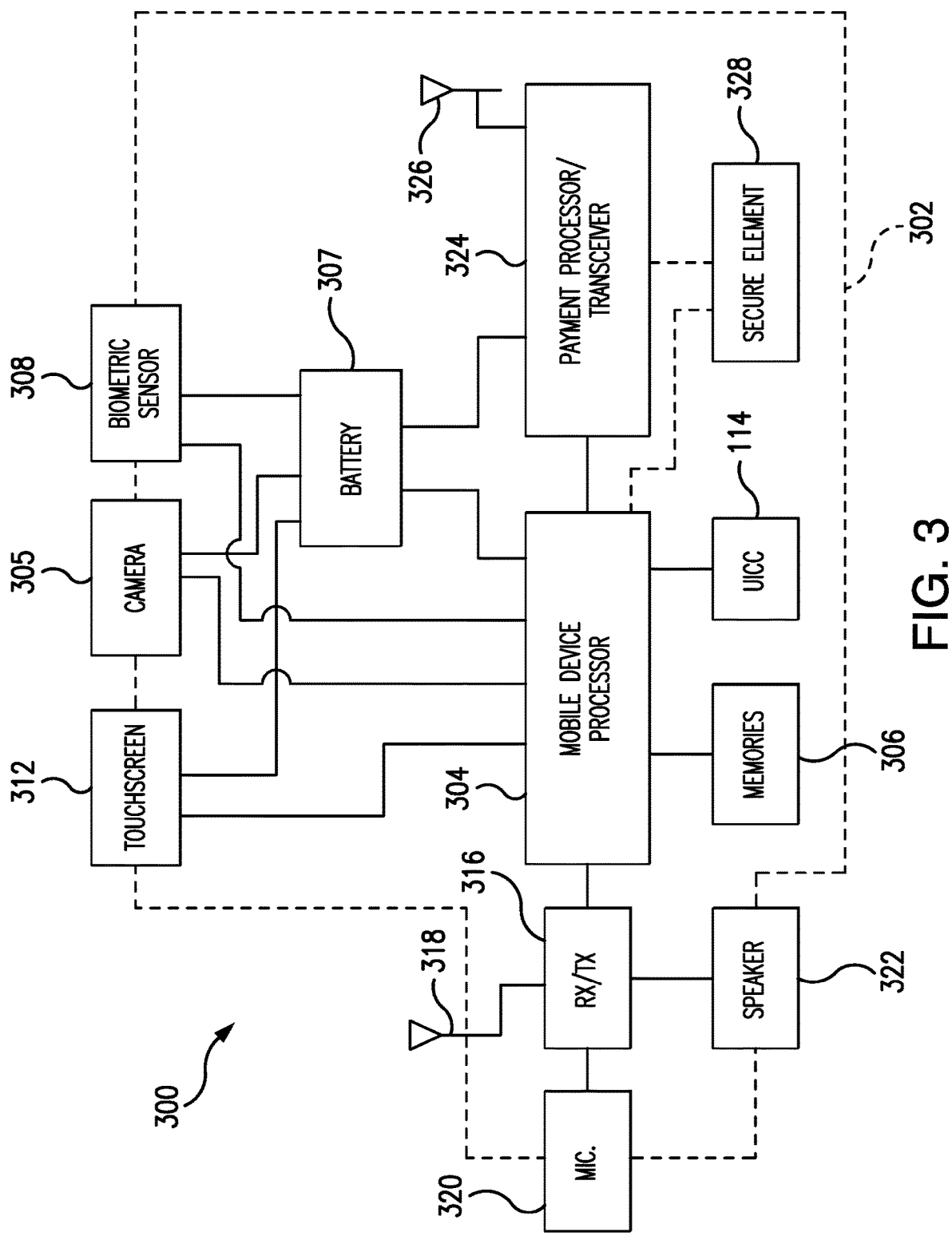
FIG. 3 is a block diagram of a consumer mobile device to illustrate hardware aspects according to some embodiments of the disclosure.

FIG. 3 is a block diagram of an embodiment of a user's mobile device 300 to illustrate hardware aspects in accordance with some embodiments. In this example, the user's or consumer's mobile device 300 is a smartphone capable of storing the user's personally identifiable data in a personal data store (PDS) of a regular memory (see FIG. 1A), and of running mobile applications in accordance with the methods described herein. But it should be understood that the mobile device 300 could be another type of electronic mobile device, such as a laptop computer or a tablet computer that includes wireless communications capability. In some embodiments, the novel functionality described herein may result at least partially from software and/or firmware that improves and/or transforms one or more electronic device components, such as one or more controllers and/or mobile device processors of the smartphone 300.

The smartphone 300 may include a housing (indicated by dashed line 302 in FIG. 3) that contains and/or supports the mechanical and electronic components of the smartphone. The housing 302 may be shaped and sized to be held in a user's hand and may for example exhibit the type of form factor that is common with the current generation of smartphones. The smartphone further includes a mobile device processor 304 for controlling over-all operations.

Other components of the smartphone 300, which are in communication with and/or controlled by the mobile device processor 304, include one or more storage devices or memory devices 306 (which may be apportioned as regular memory, program memory, working memory and the like), a UICC (universal integrated circuit card) 114, a digital camera 305, a biometric sensor 308 (which may be, for example, a fingerprint sensor, motion sensor, and/or iris sensor, or the like) and a touchscreen 312 (which may serve as the primary input/output device of the smartphone). A battery 307 provides power to the electronic components, and is shown operably connected to the mobile device processor 304, the camera 305, the biometric sensor 208, a touchscreen 31 and a payment processor and/or transceiver 324. For ease of reference, other power connections to the battery are not shown, but it should be understood that the battery 307 may also be operably connected to and/or power other components such as the microphone 320 and speaker 322.

In some implementations, the biometric sensor 308 includes one or more sensors and/or circuitry that operates to obtain and/or provide user biometric data for authenticating the user, and may include one or more authenticators that can be used to perform user authentication in association with one or more mobile applications. Other components, including different types of sensors and/or authenticators may be included and may be functional, for example, to provide other types of identification data such as mobile device identification data.

The touchscreen 312 may be utilized by the user or consumer for inputting information and for viewing information displayed thereon. In some implementations, depending on the make and/or model, the smartphone 300 may also include physically-actuatable switches and/or controls (not shown), such as an On/Off/Reset switch, a menu button, a "back" button, a volume control dial or switch, and the like.

The smartphone 300 also includes receive/transmit circuitry 316 operably connected to and/or in communication with and/or controlled by the mobile device processor 304. In some implementations, the receive/transmit circuitry 316 is coupled to an antenna 318 and provides the communication channel(s) by which the smartphone communicates via a mobile telephone communication network (not shown). Thus, the receive/transmit circuitry 316 may operate both to receive and to transmit voice signals, in addition to performing other and/or additional data communication functions. As is known to those who are skilled in the art, such data communications may be via HTTP (HyperText Transfer Protocol) or other Internet communication protocol(s) and/or text messaging protocols suitable for carrying out data communication over the Internet and/or other types of computer networks and/or communications networks.

The smartphone 300 further includes a microphone 320 and speaker 322 coupled to the receive/transmit circuitry 316. The microphone 320 is utilized to receive voice input from the user whereas the speaker 322 provides sound output to the user. Thus, the receive/transmit circuitry 316 may operate to transmit, via the antenna 318, voice signals generated by the microphone 320, and to reproduce, via the speaker 322, voice signals received via the antenna 318. The receive/transmit circuitry 316 may also handle transmission and reception of text messages and/or other data communications and/or mixed media communications (such as pictures, video and the like) via the antenna 318.

In some embodiments, the smartphone 300 includes a payment processor and/or transceiver 324, which may be a specially designed integrated circuit (IC) or chipset. The payment processor and/or transceiver may be partly or wholly dedicated to implementing Near Field Communication (NFC) functionality of the smartphone. Thus, the smartphone 300 may also include a loop antenna 326 coupled to the payment processor/transceiver 324. In some implementations, the payment processor and/or transceiver 324 may partially overlap with the mobile device processor 304 of the smartphone.

In addition, the payment processor and/or transceiver 324 and the mobile device processor 304 may be operably connected to a secure element 328. The term "secure element" is known to those who are skilled in the art, and typically refers to a device that may include a small processor and volatile and/or nonvolatile memory (not separately shown) that is secured from tampering and/or reprogramming by suitable measures. According to aspects of the present disclosure, in some embodiments, the UICC 114 and/or the secure element 328 may be provisioned with one or more application programs (or "apps"). For example, the UICC 114 and/or secure element 328 may include a PDS Crypto application or PDS Crypto cardlet provisioned or provided by Mastercard International Incorporated (including payment card account processor access control rules), and may also include a Secure Element application (including issuer access control rules) provisioned or provided by an issuer financial institution (See FIG. 1A).

As explained above, in some smartphone implementations the UICC 114 generates an encryption key which is used to protect the user's encrypted personally identifiable data (PID) which is stored in a PDS of regular memory (See FIG. 1A) from unauthorized access. In some embodiments, the UICC 114 has the same or similar form factor as a SIM card (not shown), and the UICC 114 may be programmed in accordance with aspects of the present disclosure. It should be noted that the term "secure element" is not intended to be limited to devices that are IC-based, but rather may also include any secure execution environment in a mobile device, and may include software based secure execution environments running, for example, on the mobile device processor 304.

It should also be understood that the smartphone 300 may be operable as a conventional mobile telephone for communication—both voice and data—over a conventional mobile telecommunications network (not shown). Thus, the smartphone may be in communication from time to time in a conventional manner with a mobile network operator ("MNO"), which is not shown.

As is familiar to consumers or users, the smartphone 300 can be viewed as a small computing device, and thus may include one or more processors that are programmed by software, apps and/or other processor-executable steps to provide functionality as described herein. The one or more processors may be customized and/or optimized to provide functionality as described herein. In addition, the software, apps and/or other processor-executable steps may be stored in one or more computer-readable storage media (such as the storage devices 306 and/or the secure element 328 and/or storage components of the UICC 114; see FIG. 1A) and may comprise program instructions, which may be referred to as computer readable program code means. Thus, the storage devices 306 and/or secure element 328 and/or the UICC may store processor executable instructions which, when executed cause the mobile device processor to function as described herein.

Figure 4A:
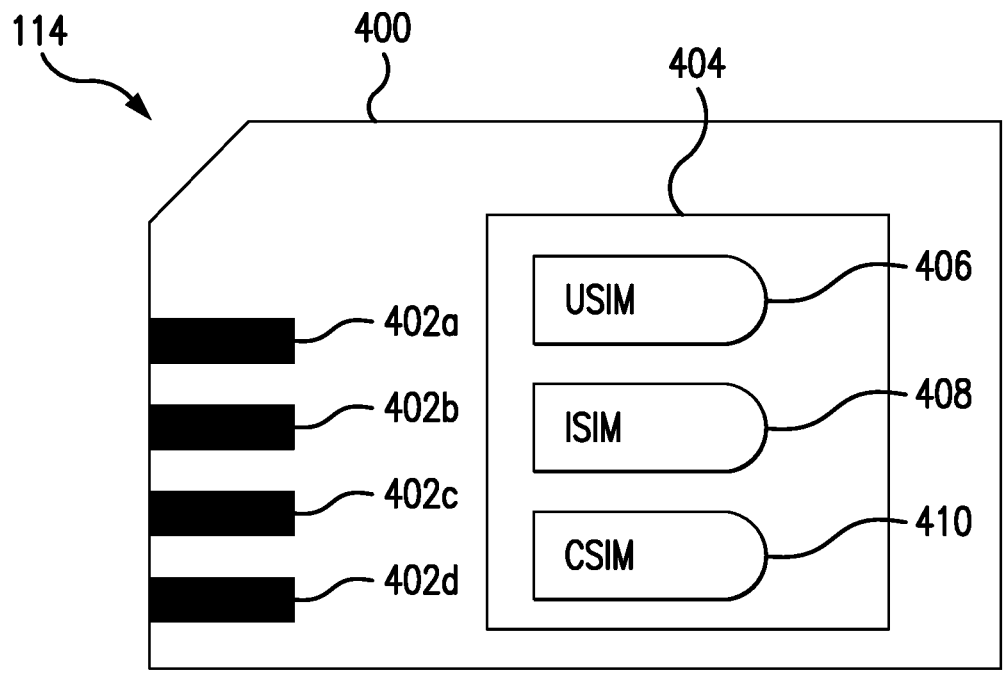
FIG. 4A is a diagram of a universal integrated circuit card (UICC) in accordance with some embodiments of the disclosure.

FIG. 4A is a diagram illustrating example components of a UICC 114 in accordance with some embodiments. The UICC 114 may include a housing 400, contacts 402a, 402b, 402c and 402d, and an integrated circuit (IC) area 404. The housing 400 may be made of plastic, metal or a composite material, and may be small in size, for example smaller than a thumbnail and is designed to protect the IC area 404 from outside elements. The electrical contacts 402a, 402b, 402c and 402d are typically metallic and designed to electronically connect the UICC 114 to contacts (not shown) of a user's mobile device, and may receive power from the batter (See FIG. 3) from the user's mobile device. The IC area 404 may include a Universal SIM (USIM) 406, an IMS SIM (ISIM) 408, and a CDMA SIM (CSIM) 410. The USIM 406 may store subscriber information and authentication information for accessing a GSM access network and/or for accessing an LTE access network (not shown), and may also include storage space for SMS messages and contacts. The ISIM 408 may store a subscriber's IMS identity, such as a public IMS identity and a private IMS identity. The CSIM 410 may store subscriber information and authentication information for accessing a CDMA access network.

Although FIG. 4A shows example components of an example UICC 114, in other implementations the UICC 114 may include fewer components, different components, differently arranged components, or additional components. In addition, one or more components of the UICC 114 may perform the tasks described as being performed by one or more other components of UICC 114.

Figure 4B:
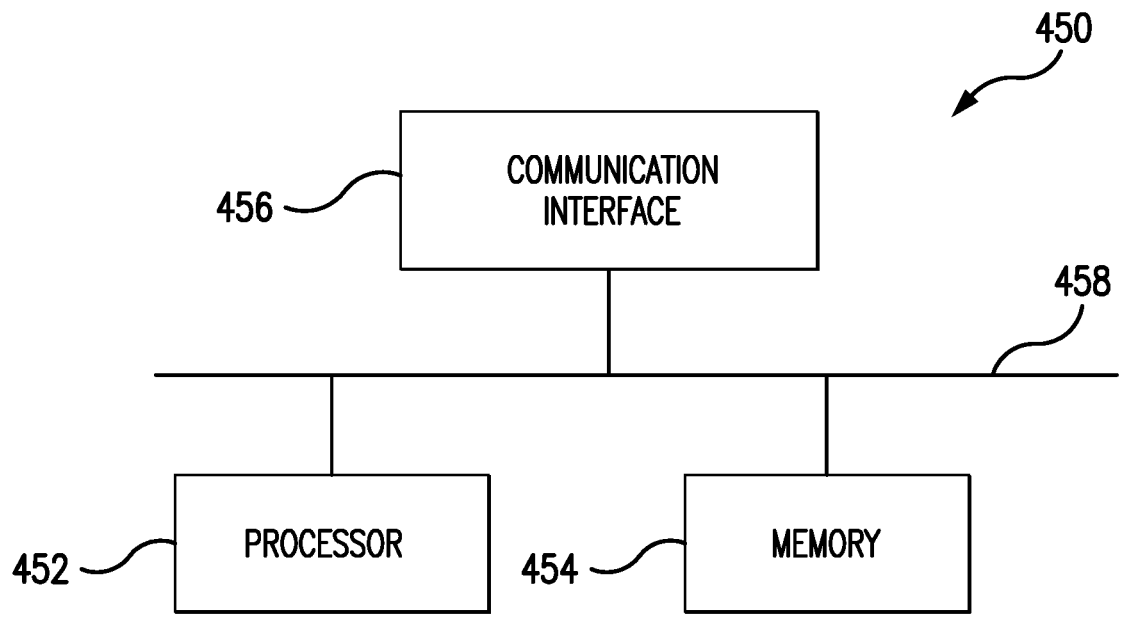
FIG. 4B is a block diagram illustrating example components of a USIM, ISIM, and/or CSIM of FIG. 4A in accordance with some embodiments.

FIG. 4B is a block diagram 450 illustrating example components of USIM 406, ISIM 408, or CSIM 410 in accordance with some embodiments. As shown in FIG. 3B, the USIM 406, the ISIM 408, and/or the CSIM 410 may include a processor 452, a memory 454 and a communication interface 456 operably connected together via a bus 458. The processor 452 may include one or more processors, microprocessors, or processing logic (e.g., ASICs or FPGAs) that may interpret and/or execute processor executable instructions. The memory 454 may include a random access memory (RAM) device or another type of dynamic storage device that may store information and instructions for execution by the processor 452, and/or may include a read-only memory (ROM) device or another type of static storage device that may store static information and/or instructions for use by the processor 452. There is no standard storage capacity for a UICC 114, but such smart cards typically have between about two-hundred and fifty-six kilobytes (256 KB) of storage space and one gigabyte (1 GB) or more of storage space. The communication interface 456 may include any interface mechanism that enables the USIM 406, the ISIM 408, and/or the CSIM 410 to communicate with the user's mobile device. Although FIG. 4B shows example components of the USIM 406, the ISIM 408, and/or the CSIM 410, in other implementations fewer components, different components, differently arranged components, or additional components than depicted in FIG. 4B may be utilized.

The processes disclosed herein efficiently secure a user's personally identifiable data, which is stored in a Personal Data Store (PDS), from unauthorized access in a manner that avoids becoming a significant resource drain on the mobile device. In particular, the methods described herein advantageously secure an encrypted PDS by using an encryption key that is bound and protected by the UICC secure element (SE). In some embodiments, each off-UICC Secure Element (SE) application has a different shared secret with the PDS. This is advantageous because if any one particular SE application is hacked or otherwise compromised then the encryption key is not exposed for all the other SE applications.

In addition, some embodiments beneficially utilize a PDS Crypto Services cardlet which provides access control to protect the personally identifiable data of the user stored in the encrypted PDS from unauthorized off-UICC SE applications. Moreover, some embodiments require strong consumer authentication using biometric data before unlocking access to the encrypted PDS store. Accordingly, a combination of successful biometrics data match (consumer authentication) and matching rules stored in the SE for the target application unlocks the key to decrypt the data stored in the encrypted PDS, and/or allows the addition of data or modification of data in the PDS. Thus, embodiments disclosed herein permit personally identifiable data to be securely stored in the PDS (which is part of regular device memory) while at the same time advantageously preventing unauthorized access and persisting the PDS data across multiple authorized applications running on the same mobile device. In some embodiments, the PDS data is bound to the application or app for which the PDS data was created. Thus, if any particular mobile application (or app) is deleted by the user, so is the associated PDS data.

As used herein and in the appended claims, the term "computer" should be understood to encompass a single computer or two or more computers in communication with each other. In addition, as used herein and in the appended claims, a "server" includes a computer device or system that responds to numerous requests for service from other devices.

Also, as used herein and in the appended claims, the term "processor" should be understood to encompass a single processor or two or more processors in communication with each other. In addition, as used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable, including simultaneous performance of steps, and/or in an order that omits one or more steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for securing access to an encrypted personal data stored on a mobile device, comprising:
receiving, by a universal integrated circuit card (UICC) processor from a mobile device processor of a mobile device that includes an encrypted Personal Data Store (PDS), a PDS access request associated with a mobile application, wherein the PDS stores personally identifiable data (PID) of a user of the mobile device;

determining, by the UICC processor, that access control rules associated with the mobile application are stored in at least one access control rules database;

transmitting, by the UICC processor via a PDS crypto application to the mobile device processor via an access control enforcer module, the access control rules governing access to the data in the encrypted PDS;

receiving, by the UICC processor from the mobile device processor, a request for a symmetric shared secret comprising a unique identifier pointing to a shared secret for decrypting data stored in the encrypted PDS;

finding, by the UICC processor using the unique identifier, the symmetric shared secret; and transmitting, by the UICC processor via the PDS Crypto application to the mobile device processor, the symmetric shared secret for use in accessing the PID of the user stored in the encrypted PDS in accordance with the access control rules.

2. The method of claim 1, further comprising, prior to transmitting the access request:

receiving, by the mobile device processor, mobile device user input data satisfying a consumer verification method (CVM);

determining, by the mobile device processor, that the mobile device user input data satisfies the CVM; and authenticating, by the mobile device processor, the user of the mobile device.

3. The method of claim 1, wherein the mobile application comprises a mobile payment application.

4. The method of claim 3, wherein access control rules for the mobile payment application are stored in an Access Rule Application Client (ARA-C) associated with a payment card account processing entity.

5. The method of claim 3, wherein access control rules for the mobile payment application are stored in an Access Rule Application Master (ARA-M) associated with an issuer.

6. The method of claim 1, wherein the access control rules comprise rules governing at least one of obtaining personally identifiable data of the user from the encrypted PDS, adding personally identifiable data of the user to the PDS, and modifying personally identifiable data of the user stored in the PDS.

7. The method of claim 1, further comprising, prior to receiving the PDS access request, agreeing, by the UICC processor with the mobile device processor, to the symmetric shared secret key by using an Elliptic-curve Diffie-Hellman (ECDH) key agreement algorithm.

8. A universal integrated circuit card (UICC) comprising a UICC processor operably connected to a memory, wherein the memory comprises at least one access control rules database and processor executable instructions which when executed cause the UICC processor to:

receive, from a mobile device processor of a mobile device that includes an encrypted Personal Data Store (PDS), a PDS access request associated with a mobile application, wherein the PDS stores personally identifiable data (PID) of a user of the mobile device;

determine that access control rules associated with the mobile application are stored in the at least one access control rules database;

transmit the access control rules governing access to the data in the encrypted PDS to the mobile device processor via an access control enforcer module;

receive a request for a symmetric shared secret from the mobile device processor comprising a unique identifier pointing to a shared secret for decrypting data stored in the encrypted PDS;

find the symmetric shared secret by using the unique identifier; and transmit the symmetric shared secret to the mobile device processor for use in accessing the PID of the user stored in the encrypted PDS in accordance with the access control rules.

9. The UICC of claim 8, wherein the mobile application comprises a mobile payment application.

10. The UICC of claim 9, wherein access control rules for the mobile payment application are stored in an Access Rule Application Client (ARA-C) of the memory, wherein the ARA-C is associated with a payment card account processing entity.

11. The UICC of claim 9, wherein access control rules for the mobile payment application are stored in an Access Rule Application Master (ARA-M) of the memory, wherein the ARA-M is associated with an issuer.

12. The UICC claim 8, wherein the access control rules comprise rules governing at least one of obtaining personally identifiable data of the user from the encrypted PDS, adding personally identifiable data of the user to the PDS, and modifying personally identifiable data of the user stored in the PDS.

13. The UICC of claim 8, wherein the memory stores further processor executable instructions, prior to the instructions for receiving the PDS access request, which when executed cause the UICC processor to agree to the symmetric shared secret key with the mobile device processor by using an Elliptic-curve Diffie-Hellman (ECDH) key agreement algorithm.

14. A non-transitory computer-readable medium storing program instructions executable by a universal integrated circuit card (UICC) processor of a UICC, which when executed cause the UICC processor to:

receive, from a mobile device processor of a mobile device that includes an encrypted Personal Data Store (PDS), a PDS access request associated with a mobile application, wherein the PDS stores personally identifiable data (PID) of a user of the mobile device;

determine that access control rules associated with the mobile application are stored in the at least one access control rules database;

transmit the access control rules governing access to the data in the encrypted PDS to the mobile device processor via an access control enforcer module;

receive a request for a symmetric shared secret from the mobile device processor comprising a unique identifier pointing to a shared secret for decrypting data stored in the encrypted PDS;

find the symmetric shared secret by using the unique identifier; and transmit the symmetric shared secret to the mobile device processor for use in accessing the PID of the user stored in the encrypted PDS in accordance with the access control rules.

15. The non-transitory computer-readable medium of claim 14, wherein the mobile application comprises a mobile payment application.

16. The non-transitory computer-readable medium of claim 15, wherein access control rules for the mobile payment application are stored in an Access Rule Application Client (ARA-C) of the memory, wherein the ARA-C is associated with a payment card account processing entity.

17. The non-transitory computer-readable medium of claim 15, wherein access control rules for the mobile payment application are stored in an Access Rule Application Master (ARA-M) of the memory, wherein the ARA-M is associated with an issuer.

18. The non-transitory computer-readable medium of claim 14, wherein the access control rules comprise rules governing at least one of obtaining personally identifiable data of the user from the encrypted PDS, adding personally identifiable data of the user to the PDS, and modifying personally identifiable data of the user stored in the PDS.

19. The non-transitory computer-readable medium of claim 14, which stores further processor executable instructions, prior to the instructions for receiving the PDS access request, which when executed cause the UICC processor to agree to the symmetric shared secret key with the mobile device processor by using an Elliptic-curve Diffie-Hellman (ECDH) key agreement algorithm.

\* \* \* \* \*